US006811718B2

(12) United States Patent
Morel et al.

(10) Patent No.: US 6,811,718 B2
(45) Date of Patent: Nov. 2, 2004

(54) FERRITE TYPE MAGNET MANUFACTURING METHOD

(75) Inventors: Antoine Morel, Evreux (FR); Philippe Tenaud, Bernin (FR)

(73) Assignee: Ugimag SA, Saint Pierre d/Allevard (FR)

( * ) Notice: Subject to any disclaimer, the term of this patent is extended or adjusted under 35 U.S.C. 154(b) by 0 days.

(21) Appl. No.: 10/118,451

(22) Filed: Apr. 9, 2002

(65) Prior Publication Data

US 2003/0052300 A1 Mar. 20, 2003

(30) Foreign Application Priority Data

Apr. 25, 2001 (FR) .............................. 01 05569

(51) Int. Cl.$^7$ .............................. H01F 1/11; H01F 41/02
(52) U.S. Cl. .............................. 252/62.62; 252/62.63; 252/62.57; 264/611; 264/427; 264/428
(58) Field of Search .............................. 252/62.63, 62.62, 252/62.57; 264/427, 428, 611

(56) References Cited

FOREIGN PATENT DOCUMENTS

| EP | 905718 | * | 3/1999 |
| FR | 2784498 | * | 4/2000 |
| FR | 2785281 | | 5/2000 |

* cited by examiner

Primary Examiner—C. Melissa Koslow
(74) Attorney, Agent, or Firm—Dennison, Schultz, Dougherty & MacDonald

(57) ABSTRACT

In the method for manufacturing ferrite type permanent magnets according to the formula $M_{1-x}R_xFe_{12-y}T_yO_{19}$:

a) a mixture of the raw materials $P_M$, $P_F$, $P_R$ and $P_T$ of elements M, Fe, R and T, respectively, is formed, Fe and M being the main raw materials and R and T being substitute raw materials;

b) the mixture is roasted to form a clinker;

c) wet grinding of said clinker is carried out;

d) the particles are concentrated and compressed in an orientation magnetic field to form an anisotropic, easy to handle green compact of a predetermined shape; and e) the anisotropic green compact D is sintered to obtain a sintered element. The surface are $G_S$ and percentage of at least one of the substitute raw materials is selected according to the surface area and percentage of the iron raw material to obtain magnets with high squareness and overall performance index properties.

11 Claims, 2 Drawing Sheets

FERRITE TYPE MAGNET MANUFACTURING METHOD

FIELD OF THE INVENTION

The invention relates to the field of permanent magnets, and more particularly ferrite type magnets comprising magnetoplumbite phase.

DESCRIPTION OF RELATED ART

The present invention relates to ferrite type permanent magnets based on magnetoplumbite phase according to the formula $MFe_{12}O_{19}$ where M is equal to Sr, Ba, etc., wherein the element M is partially substituted by an element R, chosen from the rare earths or bismuth, and wherein the element Fe is partially substituted by at least one transition metal T.

Such magnets are already known to show high magnetic properties, as disclosed in the Japanese application J10-149910 or in the European application EP-0 905 718 or in the international application WO99/34376.

In these applications, lanthanum La is frequently used as the element R and cobalt Co as the element T.

The manufacture of such magnets comprises the following steps:
  a) formation of a mixture of raw materials either using a wet process to form a dispersion, or using a dry process to form granules,
  b) roasting of the mixture at around 1250° C. to form a clinker, comprising the desired magnetoplumbite phase, said mixture, in the form of either a dispersion or granules, being introduced into a roasting furnace,
  c) wet grinding of the clinker until an aqueous dispersion of particles of particulate size of approximately 1 μm is obtained, in the form of a paste containing approximately 70% dry extract,
  d) the paste is concentrated and compressed in an orientation magnetic field of approximately 1 Tesla and under a pressure of 30 to 50 MPa so as to obtain an anisotropic green compact, containing 87% dry extract,
  e) after drying and elimination of the residual water, sintering of the green compact,
  f) final machining to obtain the magnet of predetermined shape.

The French applications No. 99 8886 and No. 99 15093 held by the applicant are also known, which disclose manufacturing methods aiming to improve certain final magnetic properties or the quality/price ratio of the magnets obtained using these methods.

According to their very varied applications, magnets must have high performances for a specific property, typically chosen from the remanence Br, generally expressed in mT, the magnetocrystalline anisotropic field Ha expressed in kA/m, the coercive field HcJ expressed in kA/m, the squareness given by $h_K$=Hk/HcJ (%), and if applicable a performance index IP, typically taken to be equal to Br+0.5.HcJ.

This especially applies in the case of applications requiring magnets particularly showing a very high squareness and, at the same time, high values for remanence Br and the coercive field HcJ, while retaining a reasonable manufacturing cost, particularly by means of low material costs and an economic manufacturing method.

The invention relates to a method making it possible to achieve all these aims at the same time, and the magnets obtained using this method.

SUMMARY OF THE INVENTION

In the method according to the invention to manufacture ferrite type permanent magnets comprising a magnetoplumbite phase according to the formula $M_{1-x}R_xFe_{12-y}T_yO_{19}$ wherein Fe and M=Ba, Sr, Ca, Pb represent the main elements, R and T being the substitute elements where R=Bi or rare earth elements, and T=Mn, Co, Ni, Zn, where x and y are typically between 0.05 and 0.5:
  a) in mixing means, typically a mixer operating in batch mode, a mixture MP of the raw materials $MP_M$, $MP_F$, $MP_R$ and $MP_T$ relating to the elements M, Fe, R and T, respectively, is formed, typically in the form of oxide, carbonate or hydroxide powders, composed of particles P, referred to as $P_M$, $P_R$, $P_F$ and $P_T$ respectively, the raw material $MP_F$ relating to the element Fe, typically iron oxide $Fe_2O_3$ and the raw material $MP_M$ representing the so-called main raw materials and the raw materials $MP_R$ and $MP_T$ representing the so-called substitute raw materials $MP_S$,
  b) said mixture is roasted in a roasting furnace to form a clinker B, based on magnetoplumbite phase according to the formula $M_{1-x}R_xFe_{12-y}T_yO_{19}$.
  c) wet grinding of said clinker is carried out, typically in a dispersion vessel in aqueous medium, to obtain a homogeneous dispersion C of separated fine particles of average particulate size of less than 1.2 μm,
  d) said particles are concentrated and compressed in an orientation magnetic field to form an anisotropic, easy to handle green compact D of a predetermined shape,
  e) said anisotropic green compact D is sintered to obtain a sintered element E,
  f) if required, a final shaping of said sintered element E is performed, typically by machining.

This method is characterised in that, in the mixture MP in step a) of the method, at least one of the substitute raw materials $MP_R$ or $MP_T$ has a grain size $G_S$, typically measured using the specific surface BET in $m^2/g$ and referred to specifically as $G_R$ or $G_T$ for the substitute raw materials $MP_R$ or $MP_T$ respectively, chosen according to the grain size $G_F$ of the main raw material $MP_F$ and according to the percentage by weight % S of said substitute raw material $MP_S$ with reference to said main raw material $MP_F$ given said formula of the ferrite $M_{1-x}R_xFe_{12-y}T_yO_{19}$ so as to obtain a mixture MP comprising, statistically or ideally, irrespective of the formula of the ferrite, a pre-determined proportion of particles $P_R$ or $P_T$ with reference to the particles $P_F$.

In this way, following its studies, the applicant recognised the importance of the relative grain size $G_R$ or/or $G_T$ of the substitute raw materials in question in relation both to the grain size $G_F$ of the iron oxide forming the main raw material $MP_F$, and to the composition of the ferrite which varies with the substitution indices x and y in the ferrite formula $M_{1-x}R_xFe_{12-y}T_yO_{19}$.

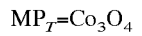

It formulated the hypothesis that the end properties of ferrites could depend not only on the overall weight ratios between the constituents, generally taken in the divided state, but also the environment of the constituents taken at the particle scale.

By studying this field, and varying the grain size of the substitute raw materials with reference to the iron oxide, the applicant observed unexpected variations in properties, particularly in terms of the squareness given by the ratio $h_K$=Hk/HcJ in %, Hk and HcJ being expressed in $kA.m^{-1}$, Hk being equal to H(Br-10%), i.e. the field corresponding to a magnetic induction taken to be equal to 0.9 Br and not 0.95 Br as is frequently encountered, which would have led to even higher values for the ratio $h_K$, but would have tended to "crush" the numerical values given the already high values obtained with magnets according to the state of the art.

In this way, the applicant observed significant increases in the ratio $h_K$, all other things being equal, both in terms of the manufacturing method which is not modified significantly, and in terms of the end properties of the ferrite magnets. Indeed, as the tests demonstrate, it is remarkable to note that the method according to the invention not only makes it possible to obtain high $h_K$ ratio values but it also retains the high levels achieved for magnetic induction Br and the coercive field HcJ, which is of particular interest in practice.

DETAILED DESCRIPTION OF THE INVENTION

In the method according to the invention, said grain size $G_S$ of a substitute raw material $MP_S$—i.e. the grain size $G_R$ and $G_T$ for the substitute raw materials $MP_R$ and $MP_T$—may be preferentially chosen according to a theoretical grain size $G_{STH}=K.G_F$ (or $G_{RTH}=K_R.G_F$ for the substitute element R, and $G_{TTH=KT}.G_F$ for the substitute element T), where $G_F$ refers to the grain size of the main raw material $MP_F$, i.e. iron oxide, the constant $K_S$ being equal to $(100\%)^{1/3}.(d_F/d_S)^{2/3}$, where $d_F$ and $d_S$ respectively refer to the specific mass of the main raw material $MP_F$ and that of the substitute raw material $MP_S$ or of their transformation products if said main or substitute raw material undergoes a chemical reaction when it is heated to the ferrite formation temperature. This is the case when $La(OH)_3$ is used as the source of the element $La(2La(OH)_3 => La_2O_3+3H_2O$ at T=380° C.). The value of $d_S$ taken into consideration is that of $La_2O_3$ and not that of $La(OH)_3$.

The same applies when Co carbonates are used as the source of the element Co.

Therefore, there is a constant $K_S$ for each substitute raw material in question. In the case of the tests conducted, the following parameters were selected:

$MP_R=La_2O_3$
$MP_T=CO_3O_4$
x=y=0.2

Figure 1:
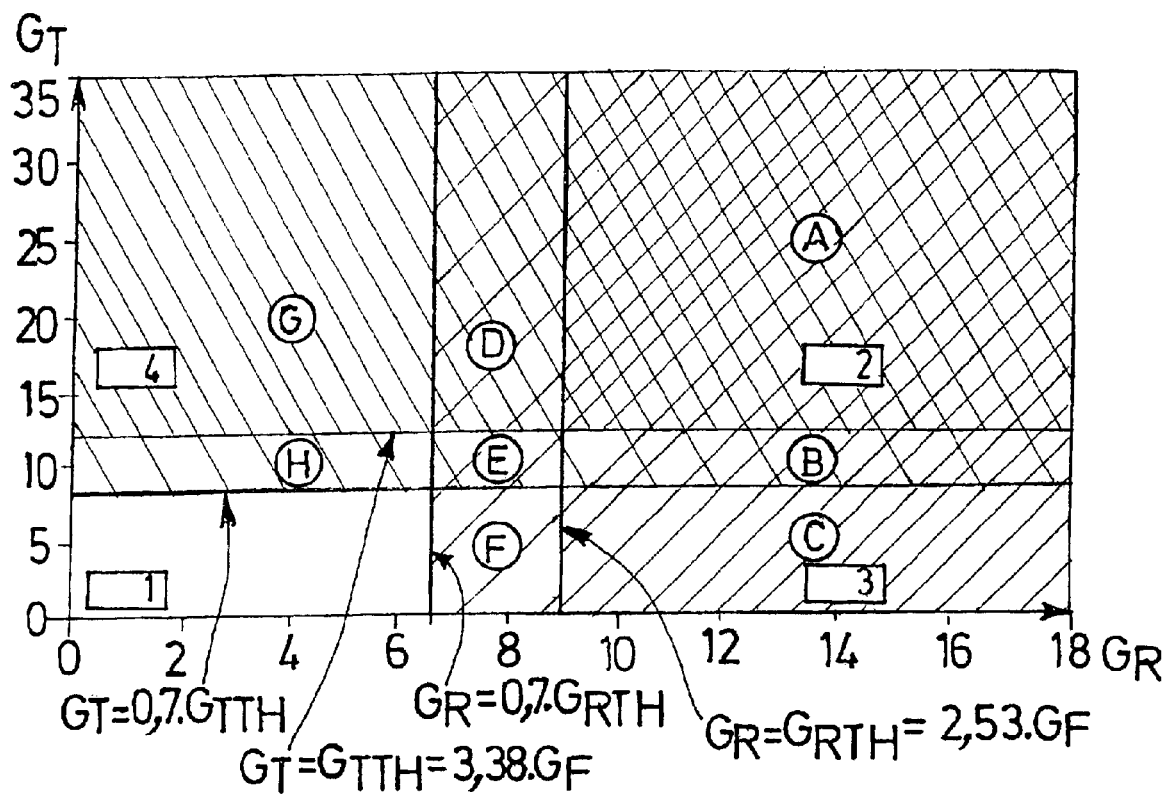
FIG. 1 is a diagram giving the grain sizes $G_R$ on the X-axis and $G_T$ on the Y-axis—expressed in $m^2/g$, of the different tests 1 to 4.

Thus for K, taking into account % S and the parameters $d_F$ and $d_S$, the values of K are equal to:

$K_R$=2.53 for the substitute raw material $MP_R=La_2O_3$
$G_{RTH}$=2.53 $G_F$
$K_T$=3.38 for the substitute raw material $MP_T=CO_3O_4$
$G_{TTH}$=3.39 $G_F$ This defines the preferential domain A as represented in FIG. 1 by a rectangle defined simultaneously by the conditions $G_R>G_{RTH}=2.53G_F$ and $G_T>G_{TTH}=3.38\ G_F$.

Other preferential sub-domains are also defined, such as the set of domains A+B+C defined by the single condition $G_R>2.53G_F$ wherein tests 2 and 3 are located, or the set of domains A+D+G defined by the single condition $G_T>3.38G_F$ wherein tests 2 and 4 are located.

According to the invention, the grain size of at least one substitute raw material MPs may be at least equal to 0.7 $G_{STH}$ or at least equal to 0.8 or at least equal to 0.9 and preferentially at least equal to $G_{STH}$.

Said grain size $G_S$ may correspond to the grain size $G_R$ of the substitute raw material $MP_R$. In this way, in FIG. 1, as already indicated, the set of data A+B+C is defined by the single condition $G_R>G_{RTH}=2.53G_F$, while the set of domains D+E+F is defined by the single condition $0.7.G_{RTH}<G_R<G_{RTH}$.

Similarly, for the second substitute raw material, said grain size $G_S$ may correspond to the grain size $G_T$ of the substitute raw material $MP_T$. In this way, in FIG. 1, as already indicated, the set of domains A+D+G is defined by the single condition $G_T>G_{RTH}=3.38G_F$, while the set of domains B+E+H is defined by the single condition $0.7.G_{TTH}<G_T<G_{TTH}$.

Preferentially, said grain size $G_S$ may correspond simultaneously to the grain size $G_R$ of the substitute raw material $MP_R$ and to the grain size $G_T$ of the substitute raw material $MP_T$. This defines a preferential domain, domain A in FIG. 1, and the sub-domains B, D and E for which at least one substitute raw material is such that $0.7\ G_{R\ or\ TTH}<G_R$ and/or $G_S<G_{R\ or\ TTH}$.

According to the invention, the grain size $G_F$ of the raw material $MP_F$ may be between 1 and 10 $m^2/g$.

The invention is not restricted to a particular magnetoplumbite type ferrite formula, by the nature of the elements M, R and T in the general ferrite formula given above.

In this way, the method according to the invention may be applied to the manufacture of any ferrite in any of claims 1 to 10 wherein the values of x and y for the element R and element T, respectively, may range from 0.05 to 0.5, and preferentially from 0.10 to 0.25.

According to a preferential method, the element R may be chosen as equal to La and the element T may be chosen as equal to Co. In this case, the constant K is taken to be equal to 3.38 for the substitute element T equal to cobalt, and the constant K is taken to be equal to 2.53 for the substitute element R taken to be equal to lanthanum.

The invention also relates to ferrite magnets obtained using the method according to the invention.

Said magnets, as demonstrated by the examples, combine the following performances:

a) the performance index IP=Br+0.5.HcJ, where Br is in mT and HcJ in $kA.m^{-1}$, is at least equal to 580, and preferentially greater than 590, at least equal to 595.

b) the squareness $h_K$=Hk/HcJ in % of the demagnetisation curve, where Hk and HcJ are expressed in $kA.m^{-1}$ and where Hk is equal to H(Br-10%), is at least equal to 0.89, and preferentially greater than 0.90, or greater than 0.92.

EXAMPLES

I—Raw Materials

Sr ferrites were produced from, as the raw material $MP_F$, an iron oxide $Fe_2O_3$ powder of specific surface area $G_F$ equal to 3.65 $m^2/g$ and specific mass $d_F$ equal to 5.24 $g.cm^{-3}$.

As the raw material $MP_M$, the source of the element Sr, strontium carbonate $SrCO_3$ in powder form with a specific surface area equal to 1.38 $m^2/g$ was also used.

Four manufacturing tests for ferrite according to the formula $Sr_{0.8}La_{0.2}Fe_{12-0.2}Co_{0.2}O_{19}$, referred to as tests No 1 to No 4, were conducted using these raw materials.

As the raw materials $MP_R$ and $MP_T$, the respective sources of the elements La and Co, $La_2O_3$ and $Co_3O_4$ were used at two specific surface area levels:

|  | $MP_R = La_2O_3$** | | $MP_T = Co_3O_4$ | |
| --- | --- | --- | --- | --- |
| Test No | 1.07 m²/g | 14.22 m²/g* | 0.96 m²/g | 16.67 m²/g* |
| No 1*** | x | | x | |
| No 2 | | x | | x |
| No 3 | | x | x | |
| No 4 | x | | | x |

*obtained by wet grinding of the corresponding low specific surface area product
**Note that this oxide transforms partly into hydroxide during the wet grinding, which is retransformed into oxide at around 400° C. during the temperature rise of the roasting step.
***Test 1 is to be considered as a test belonging to the state of the art.

These specific surface area values were chosen so as to determine with reference to a "critical" value, given the hypotheses developed by the applicant.

Given the nature of the raw materials and the formula of the ferrites manufactured, this gives, for the raw materials $MP_R$ and $MP_T$, the following elements:

for $MP_R=La_2O_3$, the specific mass $d_R$ is 6.51 g.cm$^{-3}$ and % R is equal to 3.458. Therefore, the constant $K_H$ which equals $(100/\% \ R)^{1/3}.(d_F/d_R)^{2/3}$ is equal to approximately 2.53 and the "critical" specific surface area value for the element $MP_R$—referred to as $G_{RTH}$—is therefore, given the specific surface area of iron oxide: 2.53×3.65=9.29 m²/g.

similarly, for $MP_T=Co_3O_4$, the specific mass $d_T$ is 6.07 g.cm$^{-3}$ and % T is equal to 1.704. Therefore, the constant $K_T$ is equal to approximately 3.38. The "critical" specific surface area value for the element $MP_T$—referred to as $G_{TTH}$—is therefore, given the specific surface area of iron oxide: 3.38×3.65=12.33 m²/g.

Therefore, the four tests No 1 to No 4 can be represented on the table below using a combination of "−" and "+" signs depending on the value of the specific surface areas with reference to the "critical" values defined above:

|  | $MP_R = La(OH)_3$ (=>$La_2O_3$) | | $MP_T = Co_3O_4$ | |
| --- | --- | --- | --- | --- |
| Test No | 1.07 m²/g = "−" | 14.22 m²/g = "+" | 0.96 m²/g = "−" | 16.67 m²/g = "+" |
| No 1 | − | | − | |
| No 2 | | + | | + |
| No 3 | | + | − | |
| No 4 | − | | | + |

II—Manufacture of Ferrite Magnets

The manufacturing method, identical for all the tests, comprises the following steps:

a) mixing in wet phase was conducted for 2 hours, so as to obtain a homogeneous mixture,
b) after isolating and drying the mixture formed, the mixture was roasted at 1250° C. for 2 hours in a furnace, to form a ferrite clinker,
c) the clinker are ground finely incorporating additives (1% by weight of $CaSiO_3$ and 0.94% by weight of $SrCO_3$), in two steps: during a first step, wet grinding was performed for 9 hours with 6 mm beads, and during a second step, wet grinding was performed for 7 hours with 3.2 mm beads.
d) the ground clinker particles were compressed at a pressure of 40 MPa and in a 0.8 Tesla orientation magnetic field. In this way, cylindrical blocks comprising a further 12% by weight, which were oven-dried at 80° C., were obtained.
e) the final sintering was performed at a temperature between 1190° C. and 1200° C., chosen to obtain $Pe=Br/\mu_0 Hcj$ approximately constant, so as to enable the comparison of the squareness given by the ratio $h_K=Hk/HcJ$ in %:

| Test No | Sintering temp. | Br (mT) | Hcj (kA·m$^{-1}$) | Pe |
| --- | --- | --- | --- | --- |
| 1 | 1191 | 413 | 363 | 0.91 |
| 2 | 1194 | 414 | 366 | 0.90 |
| 3 | 1197 | 411 | 364 | 0.90 |
| 4 | 1197 | 413 | 365 | 0.90 |

III—Results Obtained

III—Characteristics of Clinkers Obtained

| Test No | specific mass d in g/cm$^{-3}$ | Remanence Br (mT) | Coercive field HcJ (kA·m$^{-1}$) | Ratio Br/d | Size of ground clinker Fi (μm) |
| --- | --- | --- | --- | --- | --- |
| 1 | 2.77 | 127 | 351 | 45.8 | 0.621 |
| 2 | 2.79 | 126 | 339 | 45.16 | 0.600 |
| 3 | 2.79 | 126 | 333 | 45.16 | 0.595 |
| 4 | 2.79 | 128 | 357 | 45.9 | 0.600 |

It can be noted that the magnetic and physical properties of the clinkers obtained are very similar.

III—2 Magnet Properties

Figure 2:
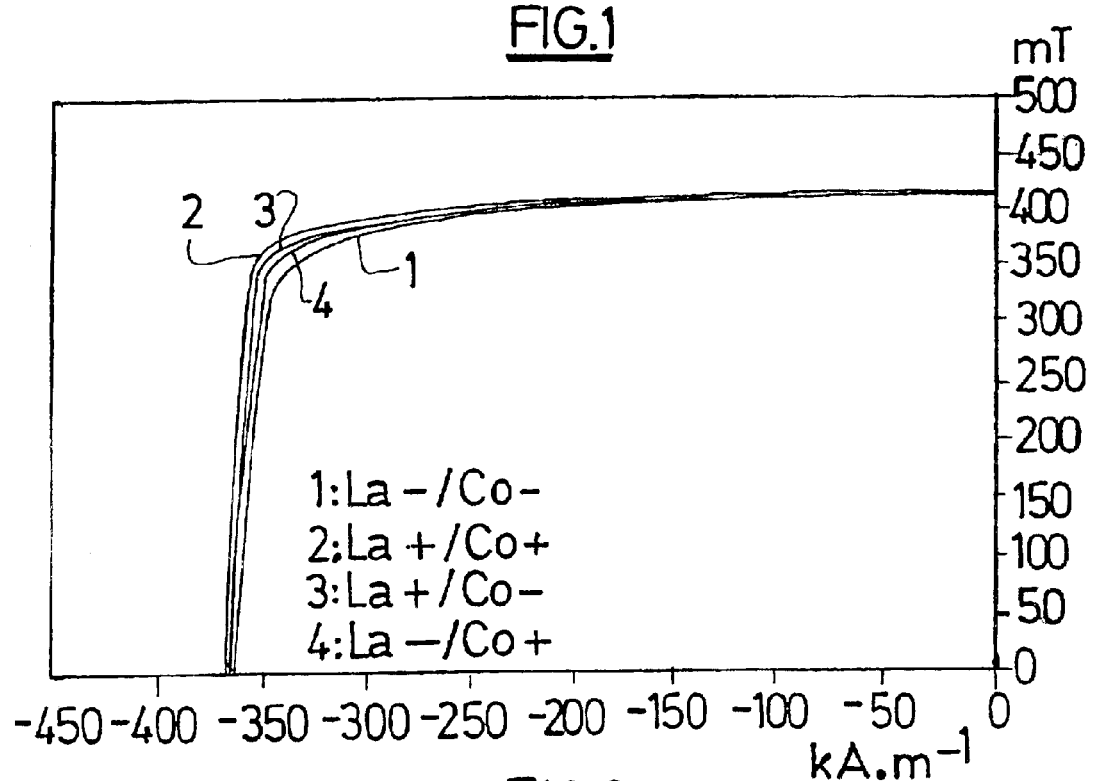
FIG. 2 is a record of the squareness for magnets obtained according to the different tests 1 to 4.

The demagnetisation curves—see FIG. 2—were plotted for each of the ferrite magnets obtained, and made it possible to measure Hk=H(Br-10%), and calculate $h_K$=Hk/Hcj. In addition, the measurement of the remanence Br and of the anisotropic field HcJ makes it possible to calculate a composite index of efficiency IP such that IP=Br+0.5.HcJ:

| Test No | Br (mT) | HcJ (kA·m$^{-1}$) | IP | Hk (kA·m$^{-1}$) | $h_K$ (%) |
| --- | --- | --- | --- | --- | --- |
| 1 (La−Co−) | 413 | 363 | 595 | 312 | 0.86 |
| 2 (La+Co+) | 414 | 366 | 597 | 340 | 0.93 |
| 3 (La+Co−) | 411 | 364 | 593 | 335 | 0.92 |
| 4 (La−Co+) | 413 | 365 | 595 | 325 | 0.89 |

Figure 3:
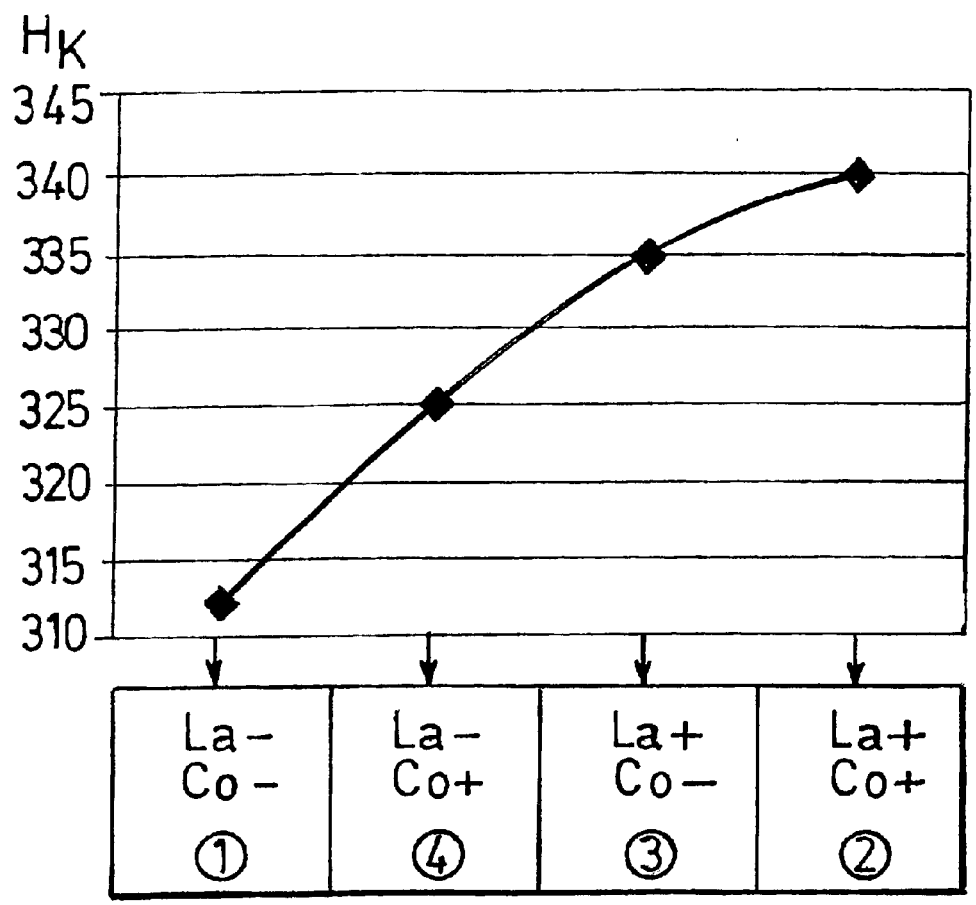
FIG. 3 illustrates, for the magnets of the different tests 1 to 4, the variation of Hk=H(Br-10%) in $kA.m^{-1}$, i.e. the field corresponding to a magnetic induction taken to be equal to 0.9 Br on the demagnetisation curve.

FIG. 3 contains the values of Hk on the Y-axis (in kA.m$^{-1}$) and on the X-axis the different tests 1 to 4, also spaced and ordered so as to obtain an increasing Hk from one test to the next.

Figure 4:
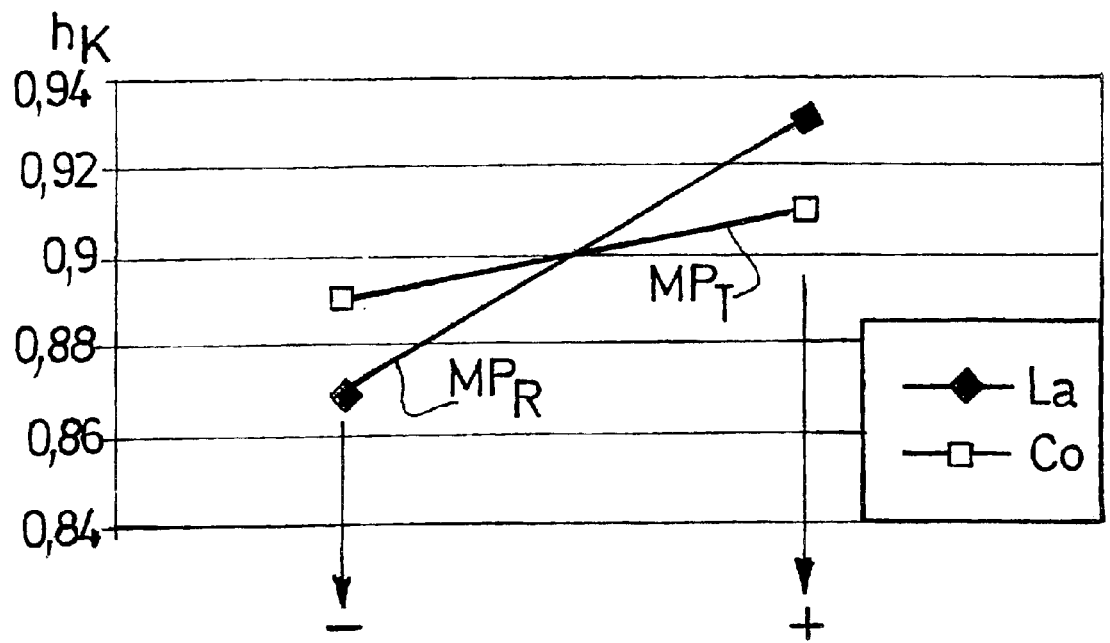
FIG. 4 illustrates the relative influence of the elements R=La and T=Co on the squareness $h_K$ of the magnets of the different tests 1 to 4.

So as to view the respective influence of the grain size of the raw materials $MP_R$ and $MP_T$ relating to the elements La and Co respectively, FIG. 4 contains the mean value of $h_K$ on the Y-axis as a function of the "low" or "−" or "high" or "+" grain size values on the X-axis, the "white" squares relating to $MP_T$, the "black" diamonds relating to $MP_R$.

For example, the curve referred to as "$MP_R$", relating to the element La, passes through the lower point ("black" diamond) on the Y-axis 0.875 and X-axis "−", since the mean of $h_K$ for both tests—tests 1 and 4—wherein the raw material $MP_R$ for the element La shows a "low" grain size equal to: (0.86+0.89)/2, i.e. 0.875.

In brief, it is possible to write symbolically: La−=>$h_K$=0.875 and similarly: La+=>$h_K$=0.925

Co−=>$h_K$=0.89

Co+=>$h_K$=0.91

According to a hypothesis of the applicant, the predominant influence of the raw material grain side for the element La with reference to that of the element Co could be explained by the differences in size and atomic weight between the two elements Co and La. The results explained could be obtained if the diffusion rate of the different chemical elements required for ferrite synthesis are considered: the influence of the particulate size would increase as the weight and size of the chemical element increased, such that the lower intrinsic diffusion would be somewhat "compensated" by a lower particulate size.

However, it is not clearly established why only the squareness $h_K$ of the demagnetisation curve is modified by the means according to the invention, while the other magnetic properties remain practically unchanged.

Therefore, according to the invention, it is possible to define different domains in the diagram of the specific surface areas $G_R$ and $G_T$ in m²/g for the raw materials $MP_R$ (element La) and $MP_T$ (element Co), as illustrated in FIG. 1.

The X-axis equal to $G_{RTH}$=2.53.$G_F$=9.29 m²/g and X-axis equal to 0.7 $G_{RTH}$ define different domains in relation to the element R=La.

Similarly, the Y-axis equal to $G_{TTH}$=3.38. $G_F$=12.33 m²/g and Y-axis equal to 0.7 $G_{TTH}$ define different domains in relation to the element T=Co.

The preferential domain of the invention is defined by the double conditions $G_T$>$G_{TTH}$ and $G_R$>$G_{RTH}$, domain A corresponding to the rectangle with crossed lines at the top right in FIG. 1, while the domain excluded from the invention is defined by the double condition $G_T$<0.7.$G_{TTH}$ and $G_R$<0.7.$G_{TTH}$, the domain corresponding to the "white" rectangle at the bottom left in FIG. 1.

Between these two "preferential" and "excluded" domains, there are different intermediate domains, referred to as domains B to H in FIG. 1. However, given the predominant influence of the grain size of the element R=La on the element T=Co, domain C in test 3 is preferable to domain G in test 4.

The invention offers the following advantages:

firstly, it can be applied to all ferrite type magnets.

second y, it makes it possible to increase the value of $h_K$ considerably, since the means according to the invention made it possible to increase $h_K$ from 0.86 to 0.93, i.e. an increase of 8%, which is very significant from a practical point of view. Indeed, this makes it possible to increase the magnetic flow in the magnetic system of motors, and in particular increase the "torque-velocity" characteristics of DC motors comprising magnets according to the invention very considerably.

finally, it makes it possible to obtain a range of magnets, offering, for the same magnetic properties, various $k_K$ values, which may be very advantageous in certain applications.

What is claimed is:

1. A method for manufacturing ferrite type permanent magnets comprising a magnetoplumbite phase of the formula $M_{1-x}R_xFe_{12-y}T_yO_{19}$ wherein Fe and M=Ba, Sr, Ca, Pb represent the main elements, and R and T are substitute elements where R=Bi or rare earth elements, and T=Mn, Co, Ni, Zn, where x and y are between 0.05 and 0.5, comprising the steps of:

a) forming a mixture of particles of raw materials M, Fe, R and T defined respectively as $P_M$, $P_F$, $P_R$ and $P_T$, said particles having, respectively, a surface area $G_M$, $G_F$, $G_R$ and $G_T$, at least one of $G_R$ and $G_T$ being selected according to $G_F$ and according to weight % S of substitute raw material particles $P_S$=$P_R$+$P_T$ with respect to $P_F$, so as to obtain a mixture comprising, statistically and ideally a pre-determined proportion of particles $P_R$ or $P_T$ with reference to the particles $P_F$;

b) roasting said mixture to form a clinker B of a magnetoplumbite phase according to a formula $M_{1-x}R_xF_{12-y}T_yO_{19}$;

c) wet grinding said clinker to obtain a homogeneous dispersion of separated fine particles of average particle size of less than 1.2 μm;

d) concentrating and compressing said separated fine particles in an orientation magnetic field to form an anisotropic green compact of a predetermined shape;

e) sintering said anisotropic green compact to obtain a sintered element;

f) optionally, performing a final shaping of said sintered element;

wherein $G_S$ is selected according to a theoretical grain size $G_{STH}$=K.$G_F$, the constant K is equal to $(100/\% S)^{1/3}$. $(d_F/d_S)^{2/3}$, where $d_F$ and $d_S$ are respectively specific mass of $P_F$ and specific mass of $P_s$, and $G_S$ of is at least equal to 0.7. $G_{STH}$.

2. Method according to claim 1, wherein $G_S$ is at least equal to 0.8.$G_{STH}$.

3. Method according to claim 2, wherein $G_S$ is at least equal to 0.9.$G_{STH}$.

4. Method according to claim 3, wherein $G_S$ is at least equal to $G_{STH}$.

5. Method according claim 1, wherein $G_S$ corresponds to $G_R$.

6. Method according claim 1, wherein $G_S$ corresponds $G_T$.

7. Method according to claim 1, wherein $G_S$ corresponds to $G_R$ and $G_T$.

8. Method according to claim 1, wherein $G_F$ is between 1 and 10 m²/g.

9. Method according to claim 1, wherein x and y are between 0.10 and 0.25.

10. Method according to claim 9, wherein the element R is La and the element T is Co.

11. Method according to claim 10, wherein K is equal to 3.38 when T is cobalt, and K is equal to a 2.53 when R is lanthanum.

* * * * *